UNITED STATES PATENT OFFICE.

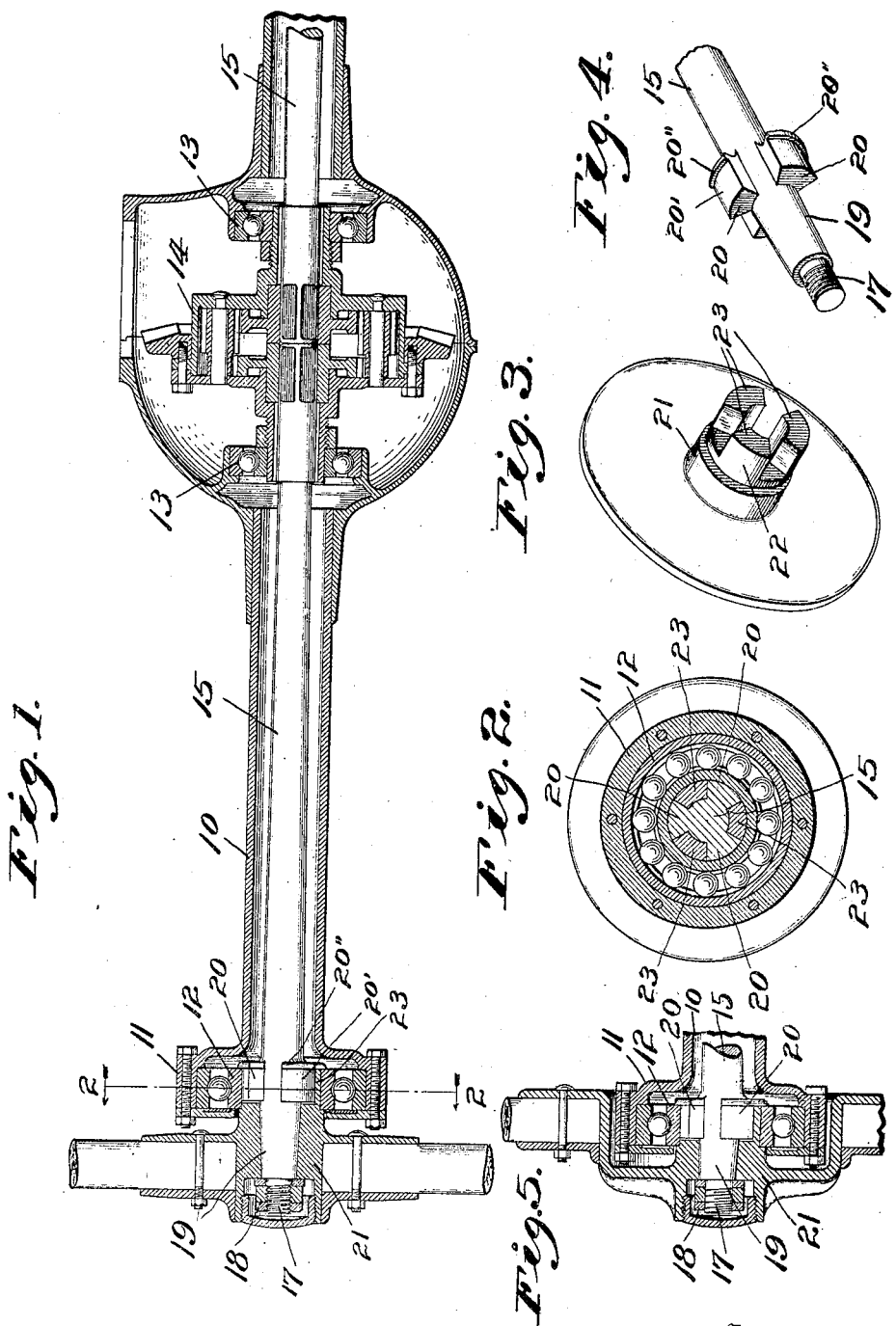

GEORGE A. WEIDELY, OF INDIANAPOLIS, INDIANA, ASSIGNOR OF ONE-HALF TO HAROLD O. SMITH, OF INDIANAPOLIS, INDIANA.

AUTOMOBILE.

No. 889,996.

Specification of Letters Patent.

Patented June 9, 1908.

Application filed June 1, 1907. Serial No. 376,824.

*To all whom it may concern:*

Be it known that I, GEORGE A. WEIDELY, a citizen of the United States, residing at Indianapolis, in the county of Marion and State of Indiana, have invented certain new and useful Improvements in Automobiles, of which the following is a specification.

In the manufacture of automobiles it has heretofore been customary to mount the driving shafts in an inclosing axle casing which supports the springs upon which the seat or other frame is supported. Probably the earliest construction is that in which each shaft section is journaled in two bearings, one near the inner end and one near the outer end, the carrying wheel being attached to the outer projected end of the driving shaft. Such an arrangement causes the weight of the carriage to be carried directly by the driving shaft sections and there is necessarily a considerable overhang or distance between the traction plane of the wheel and the vertical plane of the adjacent bearing, so that side thrusts tending at the rims of the wheels are very severe upon the bearings and shafts. Another common method has been to project the axle considerably beyond the springs and provide such projecting ends with bearings upon which the driving wheels are journaled, the driving shaft in such case being merely connected with the driving wheel by a clutch and the entire weight of the structure being supported directly by the wheels and not at all by the floating driving shaft sections. In such construction the wheel hub must be of considerable size, which is considered objectionable, and the clutch between the shaft and wheel is necessarily of such character (because of commercial limitation of size) that its inter-engaging members are comparatively small and consequently frail. And, while two bearings may be provided for each wheel, they can not be more than six or eight inches apart and, consequently, side thrusts exerted at the circumference of the wheel exert a very g at leverage upon the bearings so close together.

The object of my present invention is to produce a structure wherein the rigidity of the driving shaft, with its widely separated bearings, may be retained to resist lateral stresses in the wheels while at the same time only a portion of the weight of the vehicle is carried directly by the shaft while the main portion of said weight is carried directly by the carrying wheels, the arrangement being preferably such that the outer bearing is carried by both the driving shaft and the wheel hub. If desired, this bearing may be arranged very close to, or substantially in, the vertical plane of the carrying wheel.

The accompanying drawings illustrate my invention: Figure 1 is a vertical section of the middle and one end of a hollow axle structure embodying my invention; Fig. 2 is a section on line 2—2 of Fig. 1; Fig. 3 a perspective detail of the inner end in the wheel hub; Fig. 4 a similar detail of the outer end of one of the shaft sections, and Fig. 5 a section of a modification wherein the wheel hub is so formed as to place the adjacent bearing substantially in the plane of the wheel.

In the drawings, 10 indicates a suitable axle casing having at each end an enlargement 11 adapted to receive one ring or raceway of a ball-bearing 12. At the middle of casing 10 I provide a pair of bearings 13, 13 in which is journaled any desirable form of compensating gear 14. Mounted in each end of the casing 10 is a shaft section 15 the inner end of which is polygonal in cross-section so as to fit snugly in the corresponding opening of the compensating gear 14 in the usual well known manner. It will be readily understood that the bearings 13 may directly support the inner ends of the shaft sections and the compensating gear floated upon the inner ends of the shaft sections or provided with independent bearings without departing from my invention. The outer end of the shaft section 15 is threaded at 17 to receive the usual retaining nuts 18 and immediately adjacent the portion 17 is a wheel receiving portion 19, preferably tapered. Immediately adjacent the portion 19 the shaft 15 is provided with a plurality of radial projecting clutch teeth 20 the surfaces of the ends 20' of which are turned to a true circle and at their inner ends terminating in a radial projecting flange of lip 20″. In actual practice, in order to secure maximum strength at a minimum cost of production, I believe that it will be advisable to forge a continuous ring or flange in place of the clutch teeth 20 and turn the periphery of said flange to a true circle, thereafter making three axial cuts therethrough, as clearly shown in Fig. 4, in order to form the three clutch teeth 20 although, of course, these clutch teeth may be more or less in number than those shown and may be formed in any other suitable way without departing from my invention.

The diameter of the surface 20' is equal to the inner diameter of the inner ring or raceway of the bearing 12 and is adapted to receive the same, as clearly shown in Fig. 1, so that said inner race-way is stiffened by the shaft at its inner bearing 13. The wheel hub 21 is provided with a central bore adapted to fit upon the tapered portion 19 of the shaft 15 and this wheel hub is provided with a portion 22 having an external diameter equal to the diameter of the surface 20' and the internal diameter of the inner bearing 12 and the said portion 22 is developed into clutch teeth 23 adapted to interlock with the clutch teeth 20 of the shaft 15.

In the form shown in Fig. 1 the plane of the wheel is several inches beyond or outside of the plane of the adjacent bearing 12 while in Fig. 5 the planes of the bearing and of the wheel are substantially coincident. In either case any twisting or transverse strains at the wheel rim are transmitted through the projection 22 and teeth 23 of the wheel hub directly to the bearing 12 but at the same time those stresses are also transmitted to the shaft section 15, upon which the wheel is mounted and consequently the bearing 12 is reinforced by the bearing 13 which may be a very considerable distance, as much as twenty-four inches, from the bearing 12. As a consequence I secure by this construction not only widely separated bearings for the shaft but a portion of the load and stresses are transmitted directly from the wheel to the adjacent bearing, and a driving connection of maximum strength is possible between the driving shaft and wheel without any consequent enlargement in diameters, thus producing a wheel of the highest efficiency.

I claim as my invention:

1. In a motor vehicle, the combination, with the driving shaft, of a carrying wheel mounted upon said shaft and having a rotative engagement therewith, of a bearing engaging both the shaft and wheel, and a second bearing for said shaft.

2. In a motor vehicle, the combination of a carrying wheel, a driving shaft rigidly connected thereto, a bearing engaging the hub of the wheel and capable of resisting angular displacement of the wheel from its normal plane, and a bearing for a distant point of the shaft.

3. In a motor vehicle, the combination of a carrying wheel, a driving shaft having a driving connection therewith and taking lateral stresses therefrom, a bearing engaging the hub of the wheel and capable of resisting angular displacement of the wheel from its normal plane, and a bearing for a distant point of the shaft.

4. In a motor vehicle, the combination of a carrying wheel, a shaft rigidly connected thereto, a bearing engaging the hub of the wheel and capable of resisting angular displacement of the wheel from its normal plane, and a bearing for a distant point of the shaft.

5. In a motor vehicle, the combination of a carrying wheel, a shaft having a driving connection therewith and taking lateral stresses therefrom, a bearing engaging the hub of the wheel and capable of resisting angular displacement of the wheel from its normal plane, and a bearing for a distant point of the shaft.

6. In a motor vehicle, the combination, of a pair of driving shaft sections, a driving connection between the adjacent ends thereof, bearings supporting said adjacent ends, a carrying wheel rigidly attached to the outer end of each shaft section, and a bearing engaging the carrying wheel and capable of resisting angular displacement of the wheel from its normal plane.

7. In a motor vehicle, the combination, of a pair of driving shaft sections, a driving connection between the adjacent ends thereof, bearings supporting said adjacent ends, a carrying wheel rotatively connected to the outer end of each shaft section and laterally braced thereby, and a bearing engaging the carrying wheel and capable of resisting angular displacement of the wheel from its normal plane.

8. In a motor vehicle, the combination, of a pair of driving shaft sections, a driving connection between the adjacent ends thereof, bearings supporting said adjacent ends, a carrying wheel rigidly attached to the outer end of each shaft section, and a bearing engaging both the wheel and shaft near the outer end of the shaft.

9. In a motor vehicle, the combination, of a pair of driving shaft sections, a driving connection between the adjacent ends thereof, bearings supporting said adjacent ends, a carrying wheel rotatively connected to the outer end of each shaft section and laterally braced thereby, and a bearing engaging both the wheel and shaft near the outer end of the shaft.

10. In a motor vehicle, the combination, with a suitable axle casing, of a pair of shaft sections mounted in said casing, a driving connection between the adjacent ends of said shaft sections, bearings in said casing for supporting the inner ends of said shaft sections, clutch teeth carried by the shaft section near its outer end, a bearing between said clutch teeth and the casing, and a carrying wheel attached to the outer end of the shaft and having clutch teeth meshed with the clutch teeth of the shaft section and engaging the bearing.

11. In a motor vehicle, the combination with a suitable axle casing, of a shaft journaled therein and provided near its outer end with a series of radial clutch teeth, a wheel mounted on the end of said shaft and provided with a hub having a series of clutch teeth adapted to mesh with the clutch teeth of the shaft, and a bearing between the axle casing and the wheel.

12. In a motor vehicle, the combination, with a suitable axle casing, of a shaft journaled therein and provided near its outer end with a series of radial clutch teeth, a wheel mounted on the end of said shaft and provided with a hub having a series of clutch teeth adapted to mesh with the clutch teeth of the shaft, and a bearing arranged between the axle casing and the interengaging clutch teeth of the wheel and shaft.

13. In a motor vehicle, the combination, with a suitable axle casing, of a pair of shaft sections mounted in said casing, a driving connection between the adjacent ends of said shaft sections, bearings in said casings for supporting the inner ends of said shaft sections, a traction wheel mounted upon the outer end of each shaft section to rotate therewith and be transversely stiffened thereby, and a bearing mounted in the outer end of the casing section and held against axial displacement, said bearing having a member engaged by a thrust member carried by the wheel and shaft section.

14. In a motor vehicle, the combination, with a suitable axle casing, of a pair of shaft sections mounted therein and supported by suitable bearings at their inner ends, a differential connecting the adjacent ends of said shaft sections, angularly supported clutch teeth near the outer end of each shaft section, a traction wheel secured to the outer end of each shaft section and provided with angularly separated clutch teeth axially meshing with the clutch teeth of the shaft section, a bearing ring mounted upon said meshing clutch teeth, a bearing mounted within the outer end of the axle casing and coöperating with said bearing ring, and means for holding said bearing ring against axial displacement on the shaft section.

15. In a motor vehicle, the combination, with a suitable axle casing, of a pair of shaft sections mounted therein, a differential connecting the adjacent ends of said shaft sections, bearings for said differential in said casing, angularly supported clutch teeth near the outer end of each shaft section, a traction wheel secured to the outer end of each shaft section and provided with angularly separated clutch teeth axially meshing with the clutch teeth of the shaft section, a bearing ring mounted upon said meshing clutch teeth, a bearing mounted within the outer end of the axle casing and coöperating with said bearing ring, and means for holding said bearing ring against axial displacement on the shaft section.

16. In a motor vehicle, the combination, with a suitable axle casing, of a pair of shaft sections mounted therein and supported by suitable bearings at their inner ends, a differential connecting the adjacent ends of said shaft sections, angularly supported clutch teeth near the outer end of each shaft section, a traction wheel secured to the outer end of each shaft section and provided with angularly separated clutch teeth axially meshing with the clutch teeth of the shaft section, a bearing ring mounted upon said meshing clutch teeth, a bearing mounted within the outer end of the axle casing and coöperating with said bearing ring, and a pair of shoulders one formed on the wheel hub and the other formed on the shaft section between which said bearing ring is held.

17. In a motor vehicle, the combination, with a suitable axle casing, of a pair of shaft sections mounted therein, a differential connecting the adjacent ends of said shaft sections, bearings for said differential in said casing, angularly separated clutch teeth near the outer end of each shaft section, a traction wheel secured to the outer end of each shaft section and provided with angularly separated clutch teeth axially meshing with the teeth of the shaft section, a bearing ring mounted upon said meshing clutch teeth, a bearing mounted within the outer end of the axle casing and coöperating with said bearing ring, and a pair of shoulders one formed on the wheel hub and the other formed on the shaft section between which said bearing ring is held.

18. In a motor vehicle, the combination, with a suitable axle casing, of a pair of shaft sections mounted in said casing, a driving connection between the adjacent ends of said shaft sections, bearings in said casings for supporting the inner ends of said shaft sections, a traction wheel mounted upon the outer end of each shaft section rotate therewith and be transversely stiffened thereby, and a bearing mounted in the outer end of the casing section and held against axial displacement, said bearing having a member engaged by a thrust member carried by the wheel and shaft section, said wheel-engaging bearing lying substantially in the vertical plane of the wheel.

19. In a motor vehicle, the combination, with a suitable axle casing, of a pair of shaft sections mounted therein and supported by suitable bearings at their inner ends, a differential connecting the adjacent ends of said shaft sections, angularly supported clutch teeth near the outer end of each shaft section, a traction wheel secured to the outer end of each shaft section and provided with angularly separated clutch teeth axially meshing with the clutch teeth of the shaft section, a bearing ring mounted upon said meshing clutch teeth, a bearing mounted within the outer end of the axle casing and coöperating with said bearing ring, and means for holding said bearing ring against axial displacement on the shaft section, said wheel-engaging-bearing lying substantially in the vertical plane of the wheel.

20. In a motor vehicle, the combination, with a suitable axle casing, of a pair of shaft sections mounted therein, a differential connecting the adjacent ends of said shaft sections, bearing for said differential in said casing, angularly supported clutch teeth near the outer end of each shaft section, a traction wheel secured to the outer end of each shaft section and provided with angular separated clutch teeth axially meshing with the clutch teeth of the shaft section, a bearing ring mounted upon said meshing clutch teeth, a bearing mounted within the outer end of the axle casing and coöperating with said bearing ring, and means for holding said bearing ring against axial displacement on the shaft section, said wheel-engaging-bearing lying substantially in the vertical plane of the wheel.

21. In a motor vehicle, the combination, with a suitable axle casing, of a pair of shaft sections mounted therein and supported by suitable bearings at their inner ends, a differential connecting the adjacent ends of said sections, angularly supported clutch teeth near the outer end of each shaft section, a traction wheel secured to the outer end of each shaft section and provided with angularly separated clutch teeth axially meshing with the clutch teeth of the shaft section, a bearing ring mounted upon said meshing clutch teeth, a bearing mounted within the outer end of the axle casing and coöperating with said bearing ring, and a pair of shoulders one formed on the wheel hub and the other formed on the shaft section between which said bearing ring is held, said wheel-engaging-bearing lying substantially in the vertical plane of the wheel.

22. In a motor vehicle, the combination, with a suitable axle casing, of a pair of shaft sections mounted therein, a differential connecting the adjacent ends of said shaft sections, bearings for said differential in said casing, angularly separated clutch teeth near the outer end of each shaft section, a traction wheel secured to the outer end of each shaft section and provided with angularly separated clutch teeth axially meshing with the teeth of the shaft section, a bearing ring mounted upon said meshing clutch teeth, a bearing mounted within the outer end of the axle casing and coöperating with said bearing ring, and a pair of shoulders one formed on the wheel hub and the other formed on the shaft section between which said bearing ring is held, said wheel-engaging-bearing lying substantially in the vertical plane of the wheel.

In witness whereof, I, have hereunto set my hand and seal at Indianapolis, Indiana, this 28th day of May, A. D. one thousand nine hundred and seven.

GEORGE A. WEIDELY. [L. S.]

Witnesses:
ARTHUR M. HOOD,
THOMAS W. MCMEANS.